United States Patent [19]  [11] Patent Number: 4,878,742
Ohkubo et al.  [45] Date of Patent: Nov. 7, 1989

[54] LIQUID CRYSTAL OPTICAL MODULATOR

[75] Inventors: Yukitoshi Ohkubo, Yokohama; Yasuyuki Watanabe, Chigasaki; Chiori Mochizuki, Yokohama; Takayuki Ishii, Hiratsuka; Masato Yamanobe, Machida; Kazuya Ishiwata, Yokosuka, all of Japan

[73] Assignee: Canon Kabushiki Kaisha, Tokyo, Japan

[21] Appl. No.: 80,892

[22] Filed: Aug. 3, 1987

[30] Foreign Application Priority Data

Aug. 4, 1986 [JP] Japan .................................. 61-181938
Aug. 4, 1986 [JP] Japan .................................. 61-181939

[51] Int. Cl.$^4$ .............................................. G02F 1/13
[52] U.S. Cl. ................................ 350/347 V; 350/340; 350/341
[58] Field of Search ........... 350/340, 341, 348, 347 V, 350/350 S

[56] References Cited

U.S. PATENT DOCUMENTS 3,843,231 10/1974 Borel et al. ......................... 350/348
4,617,646 10/1986 Yang .................................... 350/333

FOREIGN PATENT DOCUMENTS 0114017 7/1983 Japan .................................. 350/340
2023865 1/1980 United Kingdom ................ 350/341
2163273 2/1986 United Kingdom ............ 350/350 S

OTHER PUBLICATIONS

L. D. Bowden and R. B. Champ, "Liquid Crystal Alignment Technique", IBM Technical Disclosure Bulletin, vol. 20, No. 8, Jan. 78.

Primary Examiner—John S. Heyman
Assistant Examiner—Huy K. Mai
Attorney, Agent, or Firm—Fitzpatrick, Cella, Harper & Scinto

[57] ABSTRACT

A liquid crystal optical modulator having a liquid crystal held between two substrates each having a light-transmissive electrode on the surface, in which at least one substrate has minute alignment-treated region having two or more kinds of liquid crystal aligning abilities different from each other formed and arranged on the same substrate.

11 Claims, 3 Drawing Sheets

LIQUID CRYSTAL OPTICAL MODULATOR

BACKGROUND OF THE INVENTION

1. Field of the Invention

This invention relates to a liquid crystal optical modulator, particularly to a transmission type of liquid crystal display device or liquid crystal optical modulator utilizing alignment control of liquid crystal molecules.

2. Related Background Art

In the prior art, techniques utilizing combination of diffraction grating with liquid crystal have been known for several different purposes.

For example, a device having grooves with periodical regularity formed on the surface of a substrate and provided with a liquid crystal thereon is known to have ability for aligning liquid crystal. Since this device is not specially intended to function as a diffraction grating, the grooves are made extremely shallow.

It is also known to form minute gratings from materials having different reflection characteristics and combine them with a liquid crystal for utilizing the polarizing function of the gratings. In this case, also, the thickness of the grating itself is not emphasized.

Further, a phase diffraction grating is known in which the grating are formed with a transparent member, and liquid crystal is disposed in the grooves on the grating. For example, in Japanese Patent Publication No. 3928/1978 and U.S. Pat. No. 4,251,137, it is disclosed as a display device or a variable color subtraction filter device. However, the device disclosed in Japanese Patent Publication No. 3928/1978 is a device for exhibiting mere decorative effect and not satisfactory as a display element for displaying letters or images, or as an optical modulating element for effecting transmission or interception of light flux.

On the other hand, the variable color subtraction filter element disclosed in U.S. Pat. No. 4,251,137 utilizes the change in diffraction effect caused by the change in refractive index difference between the grating and the liquid crystal for the light transmitting through the cell at a definite angle by varying the direction of the liquid crystal arranged between the diffraction gratings by action of an electrical field. Firstly, however, this element involves a technical difficulty in preparation, and secondly it has a drawback of unsatisfactory characteristics in actuation.

Even when a relatively large $\Delta n$ ($\Delta n$: refractive index difference) may be used with an actually available liquid crystal, for achieving sufficient diffraction effect, gratings with greater depth of groove relative to the grating pitch must be formed. Particularly, while formation of a grating having a depth and pitch of 3 $\mu m$ or less is optically effective, working technique for producing gratings with such a size requires the most advanced technique in semiconductor device, and such devices cannot easily be produced.

Next, as the problem in actuation, the liquid crystal confined in such a deep groove not only receives planar constraint from both upper and lower surfaces of the substrate, but also receives strong constraint from the walls on both sides of the groove in the grating. This means that, while the longer axes of liquid crystal molecules will stably align in the groove direction. On the contrary, when they are desired to be in another aligned state by an external force, they will greatly resist against the force. This means that the initial aligning will not easily be destroyed by an external force, namely an electrical field applied within the cell, suggesting that sharp voltage transmission characteristics required for time division characteristic cannot easily be obtained.

It has been known in the prior art that, when threshold voltage value is exceeded by applying direct current on a liquid crystal cell, "Williams domain" is generated and, when the electrical field is intensified, the width or the pitch of the domain becomes smaller to give a diffraction grating. For example, it is disclosed in Soffer et al.: "Optical computing with variable grating mode liquid crystal devices", Proc. SPIE, 1980, 218, p. 81.

The diffraction grating of this prior art undergoes change in grating pitch according to a change in voltage, and therefore spectral characteristics of diffracted light are changed. However, this diffraction grating is not beneficial in maintenance of constant diffraction conditions and time divisional driving in which a bias voltage is applied.

SUMMARY OF THE INVENTION

An object of the present invention is to solve the drawbacks of the prior art as described above and provide a novel liquid crystal optical modulator.

Further, another object of the present invention is to provide a liquid crystal optical modulator of high productivity as well as of high reliability.

The liquid crystal optical modulator gives a high degree of time divisional characteristics and a production process of an optical modulator with large area display.

According to an aspect of the present invention, there is provided a liquid crystal optical modulator comprising liquid crystal held between two substrates each having a light-transmissive electrode on the surface, at least one of substrates being provided with two or more kinds of minute alignment-treated regions having respectively liquid crystal aligning ability different from each other formed and arranged on the same substrate.

According to another aspect of the present invention, there is provided a liquid crystal optical modulator comprising liquid crystal held between two substrates each having light-transmissive electrodes on the surface, at least one of substrates being provided with two or more kinds of minute alignment treated regions having respectively liquid crystal aligning ability different from each other formed and arranged on the same substrate, and said alignment-treated region being monoaxially symmetrical.

DESCRIPTION OF THE PREFERRED EMBODIMENTS

The present invention is described in detail below.

The liquid crystal optical modulator according to the present invention comprises a fine alignment-treated regions having at least two kinds of liquid crystal aligning abilities different from each other arranged within the same substrate plane.

Out of the two or more kinds of liquid crystal aligning abilities different from each other, one typically causes homeotropic alignment and the other causes homogeneous alignment. These comprise a combination of two or more kinds of aligning abilities having any desired pretilt angles ranging from 0° to 90°, and the above combination of homeotropic/homogeneous aligning abilities is not limitative of the present invention.

Figure 1A:
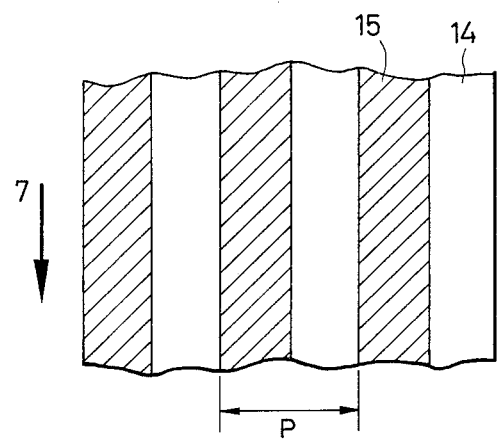
FIG. 1A is a partial plan view showing one example of the substrate having minute alignment-treated regions arranged thereon of the liquid crystal optical modulator according to the present invention.

FIG. 1 is a basic constitutional view showing an example of the liquid crystal optical modulator according to the present invention. FIG. 1A is a partial plan view showing an example of the substrate having minute alignment-treated regions arranged thereon of the liquid crystal optical modulator, which shows minute alignment-treated regions having two kinds of liquid crystal aligning abilities different from each other (hereinafter abbreviated as alignment ability region).

Figure 1B:
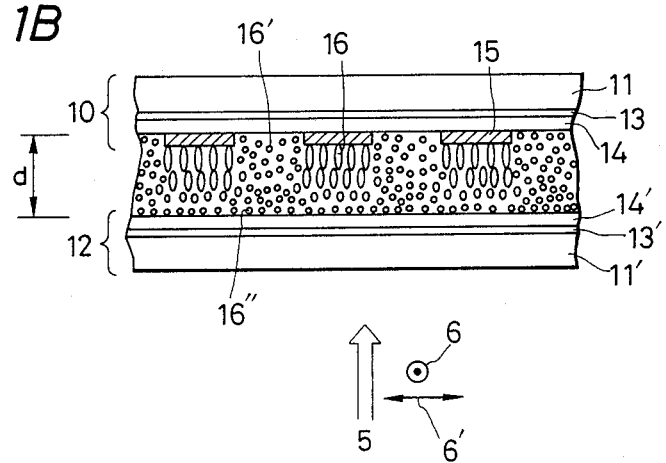
FIG. 1B is a sectional view showing one example of the liquid crystal optical modulator according to the present invention.

For example, 14 is a homogeneous alignment ability region and 15 is a homeotropic alignment ability region. FIG. 1B is a sectional view of a liquid crystal cell comprising a substrate having a surface treated for such alignment and the other substrate having a surface treated for homogeneous aligning which are opposed to each other, and having a liquid crystal held between the substrates.

11, 11' are transparent substrates such as of glass, etc., 13, 13' are transparent electrodes, 14, 14' are homogeneous alignment ability regions and 15 is a homeotropic alignment ability region. The substrates 10 and 12 with such constitution are opposed to each other with a cell gap d which is equal to or smaller than the arrangement pitch P. A liquid crystal is injected into the gap. Liquid crystals are shown by the numerals 16, 16', and 16". FIG. 1B shows a typical alignment state of the present invention. The liquid crystals 16' and 16" take a homogeneous alignment in which the director of the liquid crystal is normal to the paper surface, while the liquid crystal 16 takes a homeotropic alignment in the vicinity of the alignment-treated surface of the homeotropic alignment ability region 15. In the present invention, actuation is based on the substantial refractive index difference of the two alignment states toward the incident polarized light.

In the present invention, there are respective modes where diffraction occurs at initial alignment state without application of voltage and modes where diffraction occurs on application of voltage corresponding to the use of positive dielectric anisotropic nematic liquid crystal (Np) and negative dielectric anisotropic nematic liquid crystal (Nn), and these modes are shown in Table 1.

TABLE 1

| Mode | Liquid crystal used | Initial state Alignment | Initial state Diffraction | Voltage application Alignment | Voltage application Diffraction |
|---|---|---|---|---|---|
| 1-1 | Np | ∥/⊥ | Occurrence | ⊥ | Non-occurrence |
| 1-2 | Np | ∥ | Non-occurrence | ∥/⊥ | Occurrence* |
| 2-1 | Nn | ⊥/∥ | Occurrence | ∥ | Non-occurrence |
| 2-2 | Nn | ⊥ | Non-occurrence | ⊥/∥ | Occurrence* |

(Note)
(1) ∥: homogeneous alignment
(2) ⊥: homeotropic alignment
(3)*: non-diffraction at high voltage Example in FIGS. 1A and 1B illustrate the mode 1-1. In the following, description is made about the actuation of the case when the mode 1-1 is adopted. As shown in FIG. 1B, the incident light 5 introduced to the optical modulating element has polarized light components 6 and 6'. In the homogeneous alignment region with the liquid crystals 16' and 16" aligned normally to the paper surface, the polarized light component 6 parallel to the liquid crystal is transmitted with an extraordinary refractive index $n_e$ of the liquid crystal, while the polarized light component 6' perpendicular to the director of the liquid crystal is transmitted with an ordinary refractive index $n_o$.

When the wavelength of the incident light 5 is defined as $\lambda$, and the thickness of the regions in a different alignment state as T and the region is assumed to have rectangular cross-section, the diffraction efficiency $\eta_0$ of the zero-order transmission diffraction light relative to the respective polarizing light components 6 and 6' of the incident light may approximately be represented by the following equation (1):

$$\eta_0 \simeq \frac{1}{2}\left\{1 + \cos\left(\frac{2\pi \Delta n T}{\lambda}\right)\right\} \quad (1)$$

In the above equation, $\Delta n$ represents the refractive index difference between refractive indices $n_e$ and $n_o$. The light component 6' is transmitted with the refractive index $n_o$ in any of the liquid crystals 16, 16', are 16". Thus $\Delta n$ being zero, $\eta_0 = 1$ in equation (1), causing no diffraction.

On the other hand, the polarized component 6 is transmitted with the refractive index $n_e$ at the liquid crystals 16' and 16", and with $n_o$ at the liquid crystal 16, thus undergoing diffraction.

At this time, the diffraction efficiency becomes $\eta_0 = 0$ when satisfying the relationship of:
$\Delta nT = (m + \frac{1}{2})\lambda$ (m=0, 1, 2, 3, ...) indicating the maximum diffraction.

On application of an electrical field between the transparent electrodes 13, 13', the alignments of the Np liquid crystals of 16', 16" gradually approach approximate homeotropic alignment as the electrical field is made greater, whereby the polarized light component 6 will become sensitive only to $n_o$, whereby diffraction is extinguished.

Since the cell basically diffracts only the polarizing light component 6, it is effective to use two sheets of the same cell superposed on one another with rotation by 90° in order to obtain sufficient dark field of vision.

The mode 1-1 has different alignment regions in the apparent initial alignment which causes diffraction, while the mode 1-2 occurs when the different alignment ability regions are made latent to give no condition for diffraction, namely when $\Delta nT$ by the initial alignment is sufficiently within a small range relative to $\lambda$. The alignment-ability-treated surface different from the apparently uniform state creates a definite alignment ability region by application of an external electrical field, whereby the mode 1-2 changes toward the direction satisfying the above diffraction condition. However, in this mode 1-2, when the voltage is sufficiently great, all the molecules are aligned homeotropically in spite of the initial alignment treated region, without causing diffraction to any incident polarizing light. That is, the change of the state from non-diffraction through diffraction to non-diffraction is caused with increasing electrical field applied.

Having described above about the modes 1-1 and 1-2 as examples both employing Np liquid crystal, modes 2-1 and 2—2 employ Nn liquid crystal. The modes employing Nn liquid crystal are different from those employing Np crystals in the phenomenum that initially vertically aligned Nn crystals are laid down on application of an electric field. The principle of diffraction, however, is the same as in Np liquid crystals.

In the modes 1-2 and 2—2, although different aligning abilities are imparted to the substrate, the alignment by one of the aligning abilities is made latent.

Being individually different, various parameters which are generally liable to give these modes are shown below.

The region is stabilized when the arrangement pitch P is sufficiently greater than the cell gap d. On the contrary, as P approaches d, the initial alignment regions are made latent. As to the area ratio of the alignment ability regions of 14 and 15, when one area becomes smaller, the alignment with the smaller area is made latent. Depending on greatness and difference in the aligning abilities of the respective alignment ability regions 15 and 14, even one exhibiting sufficiently greater aligning ability as compared with the other may be made latent, and also no diffraction will occur if the difference in aligning abilities is too small.

These are also influenced by the liquid crystal materials or additives to be used, and also by the thickness or the surface state of the worked pattern formed in a stripe, and further by the temperature or the voltage during driving. In employing modes 1-2 and 2—2, they must have an adequately great latent aligning ability difference so as to create a clear aligning ability difference during application of an electrical field. In the former mode, a display recognizable by visual observation appearing as the initial state is extinguished by application of a voltage, while in the latter mode, transparent initial state under no application of voltage is used ordinarily as the light-on type display in which a display is formed by application of a voltage.

As examples of liquid crystal alignment abilities different from each other to be used in the present invention, there are mentioned polymeric films subjected to horizontal alignment treatment such as rubbing treatment may be used for a homogeneous alignment region, including, for example, polyimide, polyamide, polyester, polycarbonate, polystyrene, polyvinyl chloride, polyvinyl alcohol, etc. subjected to rubbing treatment.

As the vertical alignment treatment, there may be included surfactants having fluorinated.carbon chain (Daikin FS 150) and silicic acid esters having fluorinated carbon chain (Daikin FS 116), and also quaternary ammonium salt surfactants (DMOAP), lecithin, hexadecylamine, etc.

Otherwise, as examples taking either horizontal or vertical alignment depending on the liquid state or the liquid crystal used, there may be included inorganic coatings such as $SiO_2$, $TiO_2$, $Zr_2O_3$, $In_2O_3$, silicon nitride, etc. Also, metal coatings are analoguous materials.

The method of forming aligning abilities different from each other is not particularly limited, and there may be employed a method in which a pattern of an aligning film is formed on another aligning film as the subbing layer, and photolithographic method or printing can be applied.

For cell formation in the present invention, conventional methods employed in TN display can generally be used, but for avoiding reverse tilt at the homogeneously aligned portion, rubbing treatment is effected. The arrowhead 7 in FIG. 1A shows the rubbing direction. By making the alignment direction in the opposing substrate counter to the rubbing direction 7, a uniaxial aligning can be obtained.

According to another preferable embodiment of the present invention, there is provided a liquid crystal optical modulator, wherein at least one substrate has arrangement of two or more kinds of minute alignment-treated regions having liquid crystal aligning abilities different from each other within the same substrate plane, the alignment-treated region being uniaxially symmetrical.

Figure 2A:
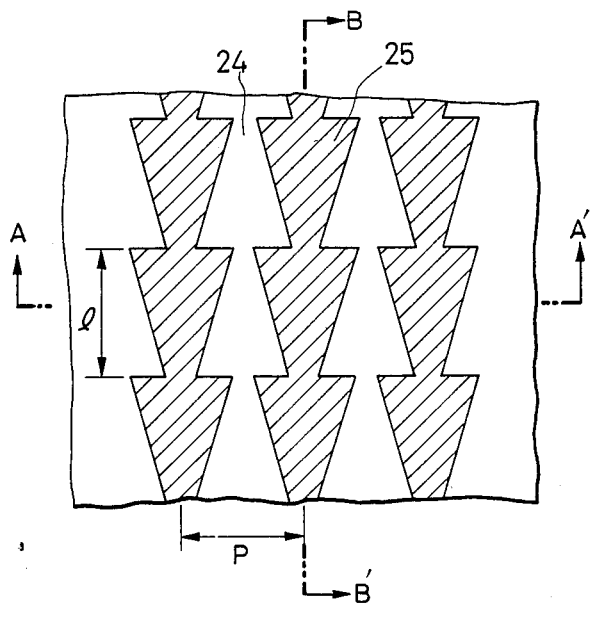
FIG. 2A is a partial plan view showing one example of the substrate having minute alignment-treated regions arranged thereon of the liquid crystal optical modulator according to the present invention.
Figure 2C:
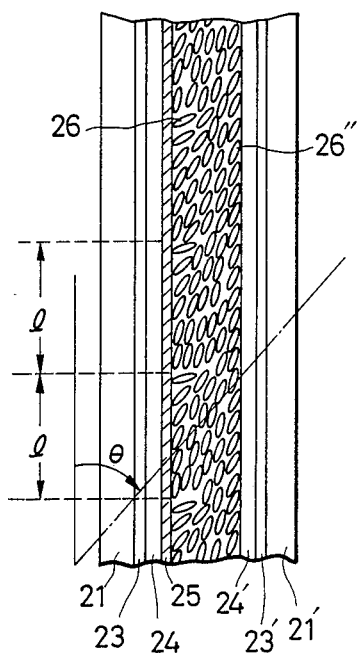
FIG. 2C is a sectional view taken along the like CC' in FIG. 2B, and FIGS. 3A, 3B and 3C are illustrations showing other examples of the minute alignment-treated regions arranged on a substrate.
Figure 2B:
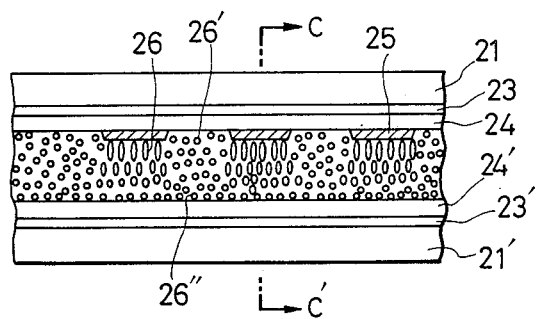
FIG. 2B is a sectional view showing one example of the liquid crystal optical modulator according to the present invention.

FIGS. 2A, 2B and 2C illustrate the basic constitutional views showing an example of the liquid crystal optical modulator according to the present invention. FIG. 2A is a partial plan view showing an example of the substrate having uniaxially symmetrical minute alignment-treated regions of a liquid crystal optical modulator, showing two kinds of minute alignment-treated regions having different liquid crystal aligning abilities (hereinafter abbreviated as alignment ability regions).

For example, 24 is a homogeneous alignment ability region, and 25 is a homeotropic alignment ability region. FIG. 2B is a sectional view of a liquid crystal cell comprising a substrate having a surface subjected to such alignment treatment opposed to the other substrate having homegeneous alignment with a liquid crystal held between the substrates, showing the sectional constitution cell taken along the line AA' in FIG. 2B.

21, 21' are light-transmissive electrodes such as of glass, 23, 23' are light-transmissive electrodes, 24, 24' are homogeneous alignment ability regions, and 25 is a homeotropic alignment ability region.

FIG. 2C is a sectional view taken along the line CC' in FIG. 2B, showing the sectional constitution of the cell taken along the BB' of the substrate in FIG. 2A. 26, 26' and 26" are liquid crystal molecules. The liquid crystal molecules are shown in a slender form in direction of the director thereof, the molecules aligning perpendicular to the paper surface are shown as circles, and the molecules in intermediate alignment are shown in intermediate length.

The homeotropic alignment ability region 25 in FIG. 2A is symmetrical with respect to the axis of the line BB' and is arranged with a pitch P from the adjacent pattern. The pattern is asymmetric with respect to the axis of the line AA' and has a directionality along the line BB'. The repeating unit of the uniaxially symmetrical pattern is shown by The opposing substrate 21' is shown as having the treated surface exhibiting homogeneous aligning ability. but it can also be made homeotropic.

In the sectional constitutional view in FIG. 2B, in the vicinity of the homeotropic alignment region 25, molecules are aligned approximately in a vertical direction, and are aligned in a horizontal direction in other homogeneous alignment ability region planes. Since arrangement of nematic liquid crystal molecules has the property of being aligned generally in the same direction through mutual actions between the adjacent molecules, even in the presence of minute different alignment-treated regions, the alignment will not change discontinuously in direct accordance to the form of the treated plane, but will change gradually and continuously with every molecule Accordingly, in the alignment treatment as shown in FIG. 2A, firstly the molecules tend to align along the symmetrical axis, and secondly the molecules align with pretilt angles such that the area of the homeotropic aligning ability region will enlarge. FIG. 2C shows schematically the state with a pretilt angle Θ of average molecules in accordance with the treated pattern in FIG. 2A.

In FIG. 2B, with such arrangement of liquid crystal molecules, the linearly polarized light normal to the paper surface causes diffraction with a pitch P as the diffraction grating as a function of the refractive index anisotropy Δn of the liquid crystals and the optical thickness determined by the distribution of the arrangement of liquid crystals as the parameters.

In the example in FIGS. 2A, 2B and 2C on application of sufficient voltage to the transparent electrodes 23, and 23', the nematic liquid crystal (Np)used having positive dielectric anisotropy aligns in a direction perpendicular to the substrate over the entire cell surface to become a uniform transparent state.

Accordingly, in this example, a liquid crystal optical modulator is obtained, in which diffraction occurs under the initial state without voltage application, while diffraction is extinguished by application of a voltage.

In contrast to this basic constitution, the substitution of the liquid crystal with negative-dielectric-anisotropy nematic crystal (Nn liquid crystal) will give similar result. Further, the selection of a pattern pitch, a form of the repeating unit for directionality, the cell gap, the kind of liquid crystal, or combination with additives or the like can give a state with an initial uniform aligned liquid crystal causing diffraction on application of voltage.

Figure 3A:
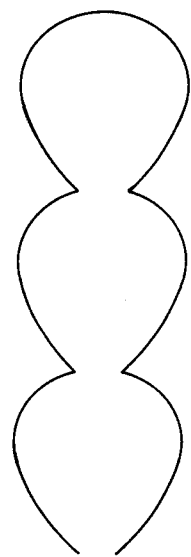
Figure 3B:
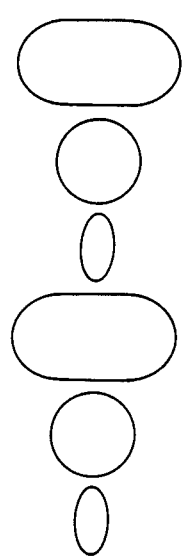
Figure 3C:
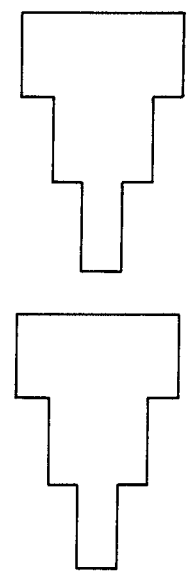

FIGS. 3A, 3B and 3C illustrate another embodiment of arrangement and arranging method of uniaxially symmetrical pattern having directionality, apart from the pattern shown in FIG. 2A.

For cell formation in the present invention, conventional methods used in TN display may be generally applicable. The uniaxially symmetrical pattern having the directionality of the present invention, however, has the specific feature of particularly providing a pretilt angle in a certain direction with difficult formation of a reverse tilt. As the opposing substrate, a substrate as shown in FIG. 1A can be also used, but in this case it is necessary to effect registration betweenthe upper and lower substrates. Practically, for obtaining necessary diffraction, particularly those requiring no registration between upper and lower plates is preferred. Accordingly, the upper and lower substrates may preferably be placed in such a relative position that the rubbing direction be antiparallel to each other.

The liquid crystal optical modulator of the present invention, since at least one substrate is formed with arrangement of minute alignment-treated region having two or more liquid crystal alignment abilities different from each other within the same substrate plane, the diffraction pitch is obtained from the regularity of arrangement, and also the above orientation treated region comprises a uniaxially symmetrical pattern having directionality. It is estimated that pretilt angles orienting to a certain direction can be imparted to the liquid crystal molecules.

The present invention is described in more detail by referring to the following Examples.

EXAMPLE 1

A substrate having successively laminated, a transparent electroconductive film composed mainly of $In_2O_3$ of 300 to 500 Å and a polyimide of 300 to 800 Å on a blue plate glass surface with a thickness of 1.1 mm, a length of 300 mm and a width of 300 mm, was spin-coated with a positive type resin of a photoresin AZ-1350J (produced by Shupley Co.) or OFPR-77 (produced by Tokyo Oka), etc. and, after it was heated at 80° C. for 10 minutes, exposure was effected according to the pattern shown in FIG. 1A with a pitch of 8 μm and a width of stripe of 4 μm, followed by baking, developing with a predetermined developing solution and drying, and the surface was dip-coated with 0.5% by weight FS-116 solution in Daifron and dried at 100° C. for 20 minutes.

Then, the remaining photoresist portion was removed together with FS-116 with the use of a release liquid such as acetone, MEK, etc., and further baked by heating at 150° C. to 200° C. for 1 hour.

By use of the above substrate and an opposing substrate treated only with the polyimide, the substrates applied with rubbing treatments in the directions counter to each other were set to face to each other with a space material with a gap of 3 μm provided therebetween, and a nematic liquid crystal RO-TN403 produced by Hoffmann La Roche was introduced internally thereof, followed by sealing at the peripheral portions to prepare a cell.

The cell exhibited diffraction without application of voltage and was extinguished substantially completely at with application of voltage of 2 V. Voltage transmission characteristic was sharp so that time divisional driving at a number of 3 ciphers could be possible.

EXAMPLE 2

A cell was constituted in the same material constitution as in Example 1 with a pattern pitch of 3 μm, a stripe width of 1.5 μm and a cell gap of 1.5 μm. No diffraction occurred at the initial state, and a strong diffraction occurred at around 1.5 V. When voltage was increased to 3 V on the cell, diffraction was extinguished.

EXAMPLE 3

On a substrate having, successively laminated, a transparent electroconductive film composed mainly of $In_2O_3$ of 300 to 500 Å and a polyimide of 300 to 800 Å on a blue plate glass surface with a thickness of 1.1 mm, a length of 300 mm and a width of 300 mm, was spin-coated a positive type resin of a photoresist AZ-1350J (produced by Shupley Co.) or OFPR-77 (produced by Tokyo Oka), etc. and, after it was heated at 80° C. for 10 minutes, exposure was effected according to the pattern shown in FIG. 1A with a pitch of 8 μm and widths of stripe of maximum 7.2 μm and minimum 0.8 μm, a width of repeating unit of 10 μm, followed by baking, developing with a predetermined developing solution and drying, and the surface was dip-coated with 0.5% by weight solution of FS-116 in Daifron and dried at 100° C. for 20 minutes.

Then, the remaining photoresist portion was removed together with FS-116 with the use of a release liquid such as acetone, MEK, etc., and further baked by heating at 150° C. to 200° C. for 1 hour.

By use of the substrate and an opposing substrate treated only with the polyimide, the polyimide substrate was subjected to rubbing treatment, arranged so that the pretilt angles may be made equal and set as opposed to each other with a space material with a gap of 3 μm provided therebetween, and a nematic liquid crystal RO-TN403 produced by Hoffmann La Roche was introduced internally thereof, followed by sealing at the peripheral portions to prepare a cell.

The cell exhibited diffraction without application of voltage and became transparent state at 2.2 volts with substantial extinguishment of the diffraction. The extinguishment of diffraction was uniform and no disturbance based on reverse tilt, etc. was observed.

EXAMPLE 4

A cell was constituted in the same material constitution as in Example 3 with a pattern pitch of 3 μm, stripe widths of maximum 2.4 μm and minimum 0.6 μm, a repeating unit of 4 μm, and a cell gap of 1.5 μm. There was obtained a cell in which no diffraction occurred at the initial state and no defect of microdomain, etc. was observed. When voltage of 1.8 V was applied on this cell, a strong diffraction occurred.

EXAMPLE 5

By use of the two pattern-arranged substrates used in Example 4, a cell was constituted with a cell gap of 2 μm without application of rubbing such that the pretilted liquid crystal molecules on the upper and lower substrate were mutually parallel. As the result, diffraction occurred at the initial state. When a voltage of 2.3 V was applied on this cell, it became uniformly transparent as a whole.

As described above, the liquid crystal optical modulator, since a substrate having two or more kinds of minute alignment-treated regions having liquid crystal aligning power different from each other arranged minutely within the same substrate is used for at least one of the substrates, the excellent effects as mentioned below can be obtained.

(1) As compared with grating formation in the prior art, working is easier to give higher productivity.

(2) Chemically stable orienting agents well known in the art can be used without interposition of a grating material, etc. and high reliability can be obtained.

(3) Since the refractive index difference of the liquid crystal itself is utilized, sufficiently great Δn value can be utilized, whereby desired optical characteristics can be obtained with a cell thickness larger than that of the prior art.

(4) Since only aligning treatment of the interface is applied without sealing of the liquid crystals between narrow gratings and the threshold voltage of liquid crystal is low and also the sharpness of optical change to voltage is great, the cell is suitable for time divisional driving.

(5) Since arrangement and formation of minute alignment ability regions may be performed only by surface patterning formation such as printing, etc., large area processing or multi-surface preparation with one substrate may be possible to give good productivity.

(6) A pretilt angle can be et only by formation of a grating pattern and therefore a cell with better uniformity can be prepared without entrainment of flaws or dust, as compared with the case when rubbing is performed.

What is claimed is:

1. A liquid crystal optical modulator comprising liquid crystal material held between two substrates, each substrate having a light-transmissive electrode on a surface thereof, at least one of the substrates being provided with at least two kinds of minute alignment-treated regions formed in a regular periodic arrangement with a pitch P and one of the two subtrates has hemeotropic aligning ability and homogeneous aligning ability in periodic alignment and the other substrate has homogeneous aligning ability, wherein the gap between said two substrates is no larger than P and said alignment-treated regions each have different liquid crystal aligning ability than the other regions on the same substrate.

2. A liquid crystal optical modulator according to claim 1, wherein a rubbing treatment is given in the alignment direction on the surface of the alignment-treated region arranged on the substrate surface.

3. A liquid crystal optical modulator according to claim 1, wherein said liquid crystal is nematic liquid crystal exhibiting positive dielectric anisotropy.

4. A liquid crystal optical modulator according to claim 1, wherein said liquid crystal is nematic liquid crystal exhibiting negative dielectric anisotropy.

5. A liquid crystal optical modulator according to claim 1, wherein diffraction is caused in the absence of applied voltage, and diffraction is extinguished in the presence of applied voltage.

6. A liquid crystal optical modulator according to claim 1, wherein diffraction is caused in the presence of applied voltage, and diffraction is extinguished in the absence of applied voltage.

7. A liquid crystal optical modulator according to claim 1, wherein a homogeneous alignment region is formed of a polymeric film subjected to homogeneous alignment treatment.

8. A liquid crystal optical modulator according to claim 7, wherein the polymeric film is formed of polyimide, polyamide, polyester, polycarbonate, polystyrene, polyvinyl chloride or polyvinyl alcohol.

9. A liquid crystal optical modulator according to claim 1, wherein the homegeneous aligning ability of said one substrate and the other substrate is imparted by a rubbing treatment.

10. A liquid crystal optical modulator according to claim 9, wherein the directions of the rubbing treatment imparted to said one substrate and the other substrate are parallel to each other.

11. A liquid crystal optical modulator according to claim 9, wherein the directions of the rubbing treatment imparted to said one substrate and the other substrate are crossed with each other at an angle of 90°.

* * * * *

UNITED STATES PATENT AND TRADEMARK OFFICE
CERTIFICATE OF CORRECTION

PATENT NO. : 4,878,742
DATED : November 7, 1989
INVENTOR(S) : YUKITOSHI OHKUBO ET AL.

It is certified that error appears in the above-identified patent and that said Letters Patent is hereby corrected as shown below:

COLUMN 4

Line 53, "n$\eta$o=0" should read --No=0--.

COLUMN 6

Line 68, "by" should read --by $\ell$.--.

COLUMN 9

Line 5, "repeating unit" should read
            --repeating unit $\ell$.--.

COLUMN 10

Line 9, "et" should read --set--.
   Line 21, "subtrates" should read --substrates--.
   Line 22, "hemeotropic" should read --homeotropic--.
   Line 56, "homegeneous" should read --homogeneous--.

Signed and Sealed this

Fourth Day of June, 1991

Attest:

HARRY F. MANBECK, JR.

*Attesting Officer*     Commissioner of Patents and Trademarks